H. M. LANE.
MANUFACTURE OF MOLDED SAND ARTICLES, SUCH AS FOUNDRY CORES AND DRY SAND MOLDS.
APPLICATION FILED DEC. 26, 1913.
1,233,067.
Patented July 10, 1917.
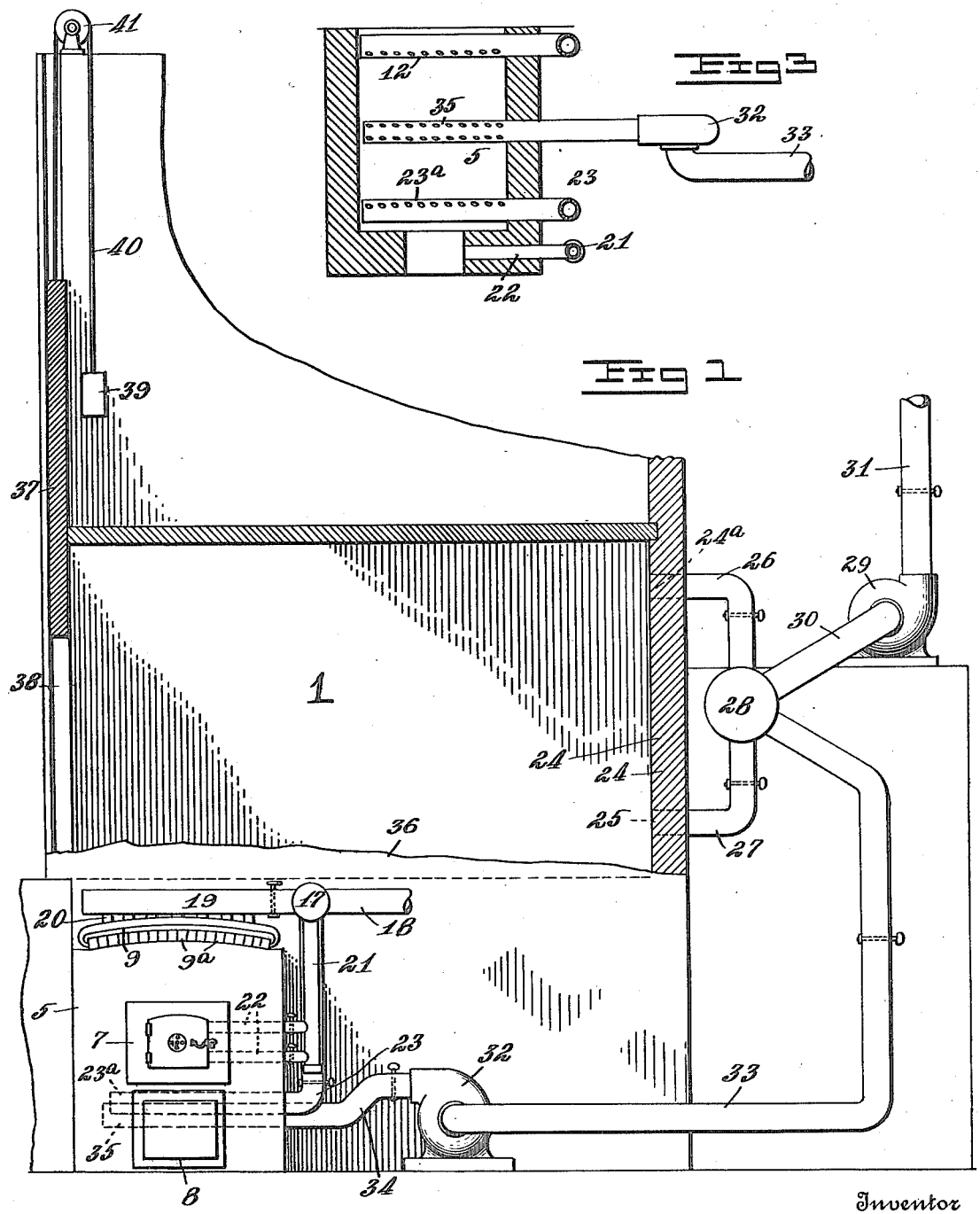
Witnesses
H. A. Robinette
George N. Daniel.
Inventor
Henry M. Lane
By K. P. McElroy.
Attorney

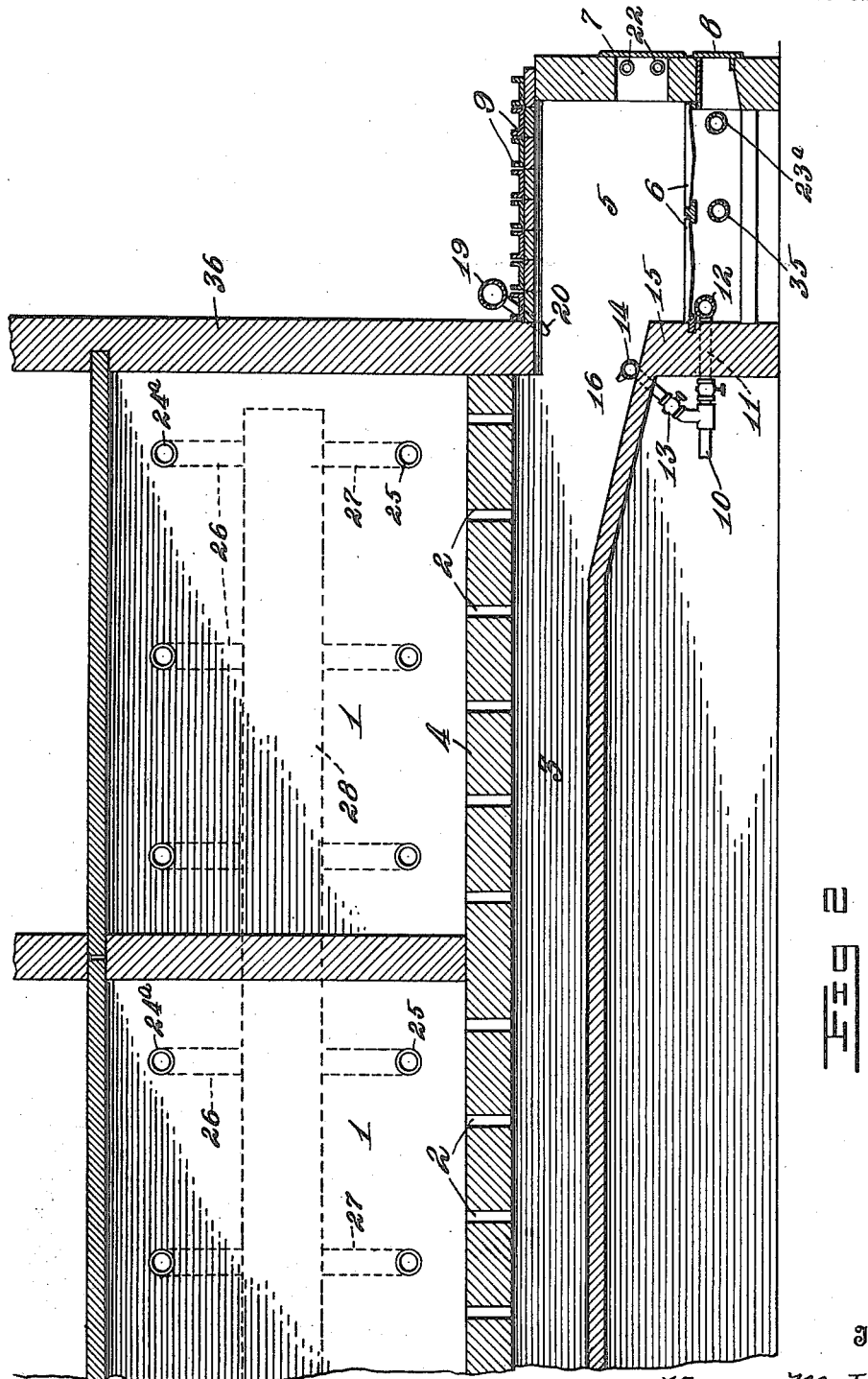

UNITED STATES PATENT OFFICE.

HENRY M. LANE, OF DETROIT, MICHIGAN.

MANUFACTURE OF MOLDED SAND ARTICLES, SUCH AS FOUNDRY-CORES AND DRY-SAND MOLDS.

1,233,067.  Specification of Letters Patent.  Patented July 10, 1917.

Application filed December 26, 1913. Serial No. 808,805.

*To all whom it may concern:*

Be it known that I, HENRY M. LANE, a citizen of the United States, residing at Detroit, in the county of Wayne and State of Michigan, have invented certain new and useful Improvements in Manufacture of Molded Sand Articles, such as Foundry-Cores and Dry-Sand Molds, of which the following is a specification.

This invention relates to the manufacture of molded sand articles such as foundry cores and dry sand molds; and it comprises a process of drying or baking foundry cores and dry sand molds in which the cores or molds are subjected to direct heating by products of combustion derived from a suitable furnace, the temperature and quality of the heating gases being suitably modified and controlled by the introduction into the combustion gases and admixture therewith of a suitable cooling and tempering diluent such as air or steam, or both, a portion of the gases, after passing in contact with the cores and containing moisture and other matter volatilized therefrom, being advantageously returned to the combustion furnace; all as more fully hereinafter set forth and as claimed.

In practically all classes of foundry work, the molding and baking or drying of cores are necessary and very extensive operations. Cores are usually made of sand which is ordinarily mixed with a binder of some kind such as rosin, linseed or other oil, glutrin (a commercial product obtained by concentrating sulfite waste liquor) glucose, etc. Cores are sometimes made without such binders but not, as a rule, where they have to be handled after making. Sand for core-making is commonly moistened or tempered with a rather small proportion of water, the requisite amount of binder is added, and the mixture is stirred or otherwise worked to secure as complete and uniform distribution of the added materials throughout the sand as is possible. The core mixture thus prepared is then molded into cores which are dried or baked, or both, to eliminate moisture and to develop the binding properties of the binder employed.

In making cores according to methods heretofore known, several difficulties are encountered which give considerable trouble and occasion loss. The finished cores must be tough and strong and, for accurate castings, must be true to size and accurate in form and outline, with smooth and sharply defined bounding surfaces and edges. Owing to the imperfections of the drying or baking methods heretofore practised, satisfactory cores of this character have been difficult to obtain and their production under the most favorable conditions has been more or less a matter of chance. The percentage of poor cores produced by such methods has been unduly large, thus making the cost of usable cores excessive Much the same difficulties have been encountered also in making dry sand molds. Dry sand molds, for steel foundry practice are ordinarily made from a mixture of "silica sand" with fireclay and a binder such as molasses, glutrin, or dextrin. In some cases common salt is used; while in others a mixture of salt and glutrin is employed.

In the following description the manufacture of foundry cores will be more particularly referred to, but it is to be understood that the invention concerns also the manufacture of dry sand molds and that the latter is included within the scope thereof.

In baking cores it has long been customary to heat the green cores directly by passing hot products of combustion in contact with them. For example, cores have been placed on trays in an oven chamber and hot gases from a suitable furnace led into and circulated among the cores, the gases carrying evaporated moisture and volatile matter from the core binder being finally discharged from the oven chamber through a suitable chimney or stack. The temperature and quantity of the furnace gases supplied to the oven depended on the rate at which the furnace was driven and both varied considerably. The object of exposing the cores to the hot furnace gases is to drive off moisture and to fuse or render more fluent the binder thus causing the latter to diffuse through the body of the core by capillary attraction and coat each particle of sand with a film of adhesive material. This completes and perfects the distribution of the binder begun when the sand and binder were mixed mechanically. Further exposure to the hot furnace gases effects changes in the character of the binder, developing its adhesive or binding properties in such a manner that upon cooling, the binder sets and becomes tough, holding the sand particles together in the finished core with considerable tenacity. If the baking conditions could be controlled in practice in such a way as to insure these operations occurring uniformly and only to the extent indicated, good cores could be easily produced.

Practically baking must be done by hot products of combustion; and such products are formed of course at a temperature too high for baking; they are delivered from any furnace or fuel burning device at a heat which will char or burn the organic matters of core binders. For this reason the baking operation is less simple in practice than in theory. If the heating be continued too long beyond the optimum period or if the temperature of the core itself be too high at any stage of the process, the organic binder is easily decomposed and even charred so that its binding power is partly or wholly destroyed, making the core worthless. As long as the sand contains substantial quantities of moisture, over-baking or burning is not apt to occur since the evaporation of the water in any portion of a core keeps the neighboring portions of the core at a temperature below that of the furnace gases. The drying of a core does not occur uniformly however. The outer surface tends to dry first and form a coating which hinders to some extent the penetration of the heat and gases into the body of the core. Thin sections, corners, edges, etc., all dry out comparatively quickly; and the danger of burning such portions of cores is always present and is seldom avoided with entire success. A core may be perfectly baked as to its interior while its edges or corners may be burned to such an extent that the sand crumbles off at these locations. This of course utterly destroys the sharp and clear-cut outlines of the cores, rendering them useless where accurate castings are required. The production of imperfect cores becomes particularly troublesome when it is attempted to force the output of cores by using high temperatures to secure rapid penetration of the cores by the heat and gases.

One of the objects of the present invention is to avoid the stated difficulties by so modifying and regulating the temperature and constitution of the hot gaseous mixture employed to bake cores that the drying and baking may be accomplished without overheating and burning. A further object of the invention is to provide apparatus suitable for carrying out the new process.

Broadly speaking, the present process is characterized by the fact that, instead of drying and baking cores by the use of combustion gases alone, a cooling diluent is introduced into the furnace gases before they are admitted to the drying oven, to modify their temperature or degree of humidity, or both; that is, the products of combustion are taken from the furnace at their normal temperature and are then admixed with such a proportion of a cooling diluent as to give a mixture having an averaged temperature that is safe. The volume and character of the diluent so introduced may vary considerably according to the rate at which the furnace is driven and according to other conditions of operation; but it should be sufficiently large to prevent the temperature at the surface of the cores from reaching a point high enough to cause over-baking and burning. In practice the diluent employed is advantageously either air or steam, or both, introduced beyond the fire in the furnace, that is, subsequent to the formation of the products of combustion. The introduction of air serves to reduce the temperature of the gases and also to increase their oxidizing power. With some classes of core binders, notably linseed oil for example, it is desirable that the heating gases be oxidizing in character in order that the binding and adhesive properties of the particular binder employed may be developed to the fullest extent. Where steam is mixed with the combustion gases, it may conveniently be exhaust steam; but in some cases water may be atomized or sprayed into the furnace gases as they pass on their way to the baking oven. It is more convenient and generally more advantageous however to introduce moisture in the form of steam. Steam thus introduced becomes superheated and the temperature of the heating gases is concomitantly reduced. The resulting mixture of gases is cooler than the untreated furnace gases, and where steam has been introduced the degree of humidity is naturally higher. This increase in humidity has a peculiar function in the present process which is of great importance. During the drying operation, the cores are always at a relatively lower temperature than the atmosphere surrounding them. When the hot gases containing superheated steam come in contact with the relatively cool cores, the steam in the immediate proximity of the core surfaces becomes substantially saturated steam, thus protecting the delicate corners and edges of the cores from overbaking and burning.

By thus attempering the gases employed in the core oven, the temperature of the oven may be maintained considerably higher than where the gases employed do not contain moisture. I have found that there are definite relations between the heat penetration into the cores and the temperature at which the oven is maintained. The higher the temperature in the oven, the more quickly does the heat penetrate to the heart of the core and consequently the shorter is the time required for baking. The blanketing or protecting effect of the moisture in the hot gaseous mixture employed in the present process renders it possible, as before described, to run the oven at much higher temperatures than would be safe under ordinary conditions, and therefore materially shortens the baking process and increases the output of a given oven.

The air or steam mixed with the furnace gases may be introduced at any suitable point in the course of their progress from the combustion furnace to the baking oven. Or steam may be introduced under the grate, and this steam in passing through the incandescent fuel bed reacts with carbon to form water gas, the subsequent combustion of which above the fuel bed regenerates steam which passes forward with the other combustion gases to the drying oven. This offers certain advantages in that it affords a method of controlling the grate temperature to prevent clinkering, burning out the grate, etc., and to deliver products of combustion at a considerably cooler normal temperature, and at the same time humidifies the products of combustion to some extent. Ordinarily, however, it is best that the cooling diluent be introduced into the hot furnace gases at a point at or near the bridge wall in the furnace, or at a point somewhat therebeyond, more accurate control of oven conditions being attainable with this method. Both methods may be simultaneously employed to advantage in some cases. Advantageously the air or steam is introduced in the form of jets under pressure and in such a manner that they exercise a kind of injector action, drawing the combustion gases rapidly from the furnace and even producing a slightly reduced pressure in the furnace. The gaseous mixture, after passing through the core oven in contact with the cores is best withdrawn from the oven by means of an exhaust fan, although under some conditions ordinary stack draft may be employed.

Since with most of the binders commonly used in making cores there is a considerable amount of volatile combustible matter given up to the heating gases during drying and baking, I find it of advantage to by-pass at least a portion of the gases leaving the oven on their way to the stack, and to return such portion beneath the grate of the furnace from which the products of combustion are derived. These returned gases also contain a considerable quantity of moisture both from the evaporation from the cores and also from the moisture introduced between the furnace and the oven. In thus feeding the returned gases to the combustion furnace, the fuel value of the combustible volatile matters is utilized, and more or less water gas is produced in passing through the bed of fuel on the grates with production of cooler effluent products of combustion. The subsequent combustion of the hydrogen of this water gas gives superheated steam and this, to some extent, maintains the moisture content of the circulating gases. Feeding the moisture containing mixture below the furnace grate also tends to prevent excessive clinkering; and to further aid in this respect it is also advantageous to supply steam *per se* below the grate. Advantageously the gases fed below the grate, together with the air necessary, for combustion, are ordinarily supplied under pressure, although this is not absolutely essential. Another advantage of thus returning exhaust gases from the oven is the attainment of a heat recuperative effect of some importance.

In a typical embodiment of the present process products of combustion may be generated by burning coke on the grate of a suitable furnace which is arranged to deliver the products of combustion into the core oven. At a point somewhat beyond the fire and advantageously in the neighborhood of the bridge wall, jets of air may be introduced obliquely to the general direction of travel of the furnace gases. In a specific instance the introduction of sufficient air to cool the furnace gases to a temperature of about 600 degrees Fahrenheit at their point of entry into the core oven has been found to work well. This temperature means a somewhat lower temperature in the oven chambers proper, and is of course subject to considerable variation depending upon the particular core binder used and other conditions of operation. At or near the point at which air is introduced, or at any other point in the travel of the furnace gases prior to their contact with the cores, steam may also be introduced; and in cases where this is done the temperature of the gases entering the oven may be somewhat higher than where no moisture is fed to the gases. For instance, it has been found feasible to employ a temperature of as high as 700° F. where steam is used in the manner described. It is to be understood of course that either air or steam may be used alone, or suitable combinations of both are also useful under many conditions. Other cooling gases than air may of course be employed, although air is generally most convenient for this purpose, and, as before stated, the necessary moisture may also be introduced in the form of water sprayed or atomized into the gases.

The apparatus required for carrying out the process above described comprises, broadly, means for generating hot gases, means for modifying their temperature or humidity, or both, and a baking or drying oven into which the thus treated gases are delivered and caused to contact with the cores to be baked. In practice, a furnace arranged for firing with a solid, liquid, or gaseous fuel may be employed. At a point somewhat beyond the main combustion zone, nozzles may be arranged obliquely to the flue through which the combustion gases pass to the core oven, and air under pressure may be blown into the flue, exercising a more or less pronounced injector action on the gases in the furnace as well as effecting the desired reduction in their temperature. Means for introducing steam is also provided. The core oven itself may be of any suitable type and is conveniently in the form of a kiln or chamber provided with a plurality of trays for conveniently supporting the cores. The modified combustion gases may enter at one end or side of the baking chamber and may pass therefrom at the opposite side into a suitable flue or flues and thence to any convenient discharge point. As before stated, it is advisable to aid the exit of the gases from the drying oven by the use of an exhaust fan which may be suitably connected to the exit flues so as to draw the gases therefrom and to discharge them for example into the stack. By-pass piping should also be provided whereby part of these exhaust gases may be returned and fed under the grate of the combustion furnace; or, if gaseous fuel be employed, these gases may be combined with the gas and the combustion aid in the firing nozzles. A supplemental fan for effecting this return of the exhaust gases may be used; or the piping system may be so arranged as to be operable by the main exhaust fan. Suitable chambers are provided in the piping system to effect the desired distribution of the gases.

In the accompanying drawings is illustrated more or less diagrammatically a typical installation of apparatus embodying the process of the present invention. In this showing, Figure 1 is an end elevation of a complete installation, partly broken away and in section;

Fig. 2 is a sectional side elevation looking toward the rear of the oven chambers; and Fig. 3 is a detail plan of the furnace showing piping connections.

The core ovens or baking chambers 1, of which there may be one or any suitable plurality, communicate by flues 2 with a main flue 3 which may be located in any desired position relative to the oven chambers, but which in this instance is shown as extending under the front ends of said chambers, the vertical connecting flues passing through the oven floor 4. Passages of gases through the vertical flues may be controlled by dampers (not shown), or by means of bricks or iron plates adapted to cover the upper ends of the flues. Products of combustion pass into the main flue from a furnace 5 which, as regards its general construction, may be of any suitable type and may be adapted to burn solid, liquid or gaseous fuel, or mixtures of these. The furnace here illustrated, however, embodies certain features of construction to be hereinafter described which render it peculiarly suited to the requirements of the present process. In the present embodiment the furnace is adapted to burn coke and has a grate 6, fire door 7, and ash door 8. The roof or arch may be of any suitable construction but is here shown as composed of bungs 9 which carry the fire brick $9^a$ and which may be readily and separately removed when repairs are necessary.

A stem main 10 has a valved branch 11 for supplying steam to a perforated or jet pipe 12 located below the furnace grate; while valved branch 13 leads to jet pipe 14 which is located near the entrance to the main flue and which is best arranged just beyond bridge wall 15. The jet pipe may have nozzles 16 arranged to discharge steam obliquely to the general direction of gas travel in flue 3.

An air main 17 is supplied through 18 with air under pressure from a blower or pump not shown. Dampered branch 19 supplies a battery of air nozzles 20 extending through the furnace arch and arranged to direct air jets obliquely into the entrance to the main flue and most advantageously a little beyond the bridge wall. Another branch pipe 21 supplies air through dampered laterals 22 to points just within and to one side of the fire door. These are for the purpose of supplying air over the fire and keeping the door cool. By using strong jets of air at 20 and thus producing rapid flow of gases through the flue, however, cooling at the door is less necessary and may often be dispensed with. Another dampered branch 23 leads from the compressed air main to the ash pit, discharging air through perforated pipe $23^a$ arranged below the grate.

In the rear walls 24 of the ovens are located a series of upper flues $24^a$ and lower flues 25 through which gases may leave the oven, passing by dampered conduits 26 and 27, respectively, to a main discharge conduit or breeching 28. The gases are best drawn by blower 29 through pipe 30 and discharged through dampered pipe or stack 31. Another blower 32 is arranged to draw any desired proportion of gases from 28 through dampered pipe 33 and force the same through dampered pipe 34 into oriflced conduit 35 arranged to discharge below the grate as shown.

The baking chambers may be variously constructed. In the type of oven here shown, the chambers have side walls 36, while at the front are vertically movable doors 37 sliding in guides 38 and each provided with a counterweight 39 secured to a cord or chain 40 passing over a suitably mounted pulley 41. The cores or molds may be supported in the oven chambers on trays (not shown) or in any other suitable way.

In carrying out the present process with the aid of the apparatus described, coke is burned on the furnace grate, forced draft being supplied below the grate through pipe 23ª and the ash pit being best kept closed. The gases resulting from the combustion of the coke pass toward main flue 3, their temperature being frequently as high as 2600 or 2700° F. This temperature is of course too high for baking cores and in order to reduce the temperature to a suitable point air is blown into the hot gases through nozzles 20 or steam is introduced through pipe 14. In most cases both steam and air are employed to advantage, since each has, in addition to its cooling effect on the furnace gases, a specific action on the cores. The steam serves to shield the edges and corners of the cores from burning, as before described; while the addition of air insures the existence of oxidizing conditions in the ovens, something generally desirable in baking cores and especially so where linseed oil or a similar oil is the binder used.

The tempered gases now pass into the main flue 3 and thence by way of vertical branch flues 2 into the ovens where they circulate in contact with the cores which are to be dried and baked, passing in the present instance from the front of the ovens toward the back where they pass out into conduit 28, whence they may be withdrawn by the exhaust blower 29 and discharged to a stack. It is not absolutely necessary to use an exhaust blower, but it is better to do so and to keep the pressure in the ovens slightly below atmospheric. Under these conditions any leakage is inward, thus preventing escape of smoke and fumes from the ovens at any time and particularly when the oven doors are opened to introduce or remove cores.

It is usually desirable to by-pass a part of the gases discharged into conduit 28 through pipe 33 and blow the same into the furnace ash pit both to utilize their combustible constituents and also to effect a slight heat recuperation by thus returning a part of the sensible heat of the oven gases to the system. It is also advantageous at times to blow in steam under the grate as through pipe 12 for the purpose of preventing clinkering as well as for affecting the character of the furnace gases. This auxiliary steam supply may be adjusted in accordance with the moisture content of the gases brought back from the ovens and fed below the grate.

The steam supply is also useful in effecting a quick reduction in the rate of combustion on the grate and a consequent lowering of oven temperature in cases where this is desirable, the reaction between steam and incandescent coke being of course strongly endothermic.

Where bituminous coal is used as fuel, in place of coke or hard coal, about the only change necessary in the furnace and oven structure is to lengthen the flue back of the fire box so as to allow ample opportunity for complete combustion of the gases before they pass into the flues opening into the oven chambers.

From the foregoing it is clear that the present invention provides a process and apparatus for rapid and delicate adjustment of the temperature and humidity of the gases for baking cores or molds of the character described, accurate control of baking conditions being thus attained, resulting in a larger output of better products than has been possible heretofore. While the particular embodiments of the present process and apparatus here described have proved of great utility in practice it is to be understood that they are illustrative only and are capable of considerable variation within the scope of the invention.

What I claim is:

1. In the manufacture of molded sand cores and the like, the process which comprises molding sand with the aid of an organic binder into the desired form, producing products of combustion at their normal temperature, mingling sufficient cooling diluent with said products of combustion to bring the averaged temperature down to a point safe with regard to such organic binder and baking said molded cores with the tempered gas mixture thus produced.

2. In the manufacture of molded sand cores and the like, the process which comprises molding sand with the aid of an organic binder into the desired form, producing products of combustion at their normal temperature, mingling sufficient air at a lower temperature with said products of combustion to bring the averaged temperature down to a point safe with regard to such organic binder and baking said molded cores with the tempered gas mixture thus produced.

3. In the manufacture of molded sand cores and the like, the process which comprises molding sand with the aid of an organic binder into the desired form, producing products of combustion at their normal temperature, mingling sufficient air at a lower temperature and steam with said products of combustion to bring the averaged temperature of the mixture thus produced down to a point safe with regard to such organic binder and baking said molded cores with the tempered gas mixture thus produced.

4. The process of baking foundry cores which comprises generating relatively cool products of combustion by firing fuel on a suitable furnace grate with the aid of air diluted with products of combustion, further cooling said products of combustion by mixing therewith a cooling diluent to bring the averaged temperature down to a point safe for contact with said cores, contacting the gaseous mixture so produced with the cores to be baked, and returning a portion of the gases after treatment of the cores at a point below said furnace grate to furnish the draft current for firing said fuel.

In testimony whereof, I affix my signature in the presence of two subscribing witnesses.

HENRY M. LANE.

Witnesses:
  GEO. P. FRASER,
  H. M. LUNIS, Jr.